W. H. HOLLAND.
MUD GUARD FOR VEHICLES.
APPLICATION FILED OCT. 6, 1914.

1,228,211.

Patented May 29, 1917.
2 SHEETS—SHEET 1.

Witnesses:

Inventor:
William Leap Holland
By his Attorneys
Rosenbaum Stockbridge & Borst

W. H. HOLLAND.
MUD GUARD FOR VEHICLES.
APPLICATION FILED OCT. 6, 1914.

1,228,211.

Patented May 29, 1917.
2 SHEETS—SHEET 2.

Witnesses:

Inventor:

UNITED STATES PATENT OFFICE.

WILLIAM HEAP HOLLAND, OF ALDERLEY EDGE, ENGLAND.

MUD-GUARD FOR VEHICLES.

1,228,211.  Specification of Letters Patent.  Patented May 29, 1917.

Application filed October 6, 1914. Serial No. 865,247.

*To all whom it may concern:*

Be it known that I, WILLIAM HEAP HOLLAND, a subject of the King of Great Britain and Ireland, and a resident of Alderley Edge, in the county of Chester, England, have invented new and useful Improvements in Mud-Guards for Vehicles, of which the following is a specification.

This invention relates to improvements in mudguards for the wheels of motor and other vehicles which are so constructed and disposed as to deflect outward and laterally mud or dust passing to them from their wheels. In carrying this invention into effect such a deflecting mudguard has combined with it a second and following deflecting device or element which interposes or permits the interposition of a stream or slice of air between the mud and dust deflected by the mudguard and the following part of the vehicle and thus blows or forces such dust and mud away from such following part. In a convenient form the mudguard may consist of a plate disposed in about a vertical plane behind the upper part of the wheel. This plate is not disposed with its leading face directly across the path of travel; it is disposed with its inside edge or edge which is nearer to the fore and aft center of the vehicle in advance of its outer or other edge. It thus acts to deflect outward mud and dust flying rearward from the wheel. The amount of such advance or the angle at which the deflector plate is inclined to the line of travel may be varied, or it may be adjustable while in use according to the conditions of road surface or speed.

Some slight distance behind the described deflector plate mudguard and about parallel to it or otherwise disposed to effect the same object is another like or equivalent member which, in conjunction with the mudguard serves to deflect outward a "slice" or stream of air to come between the deflected mud and the following part of the car, and act as a pad or cushion to keep the mud or dust off that part of the car. For example in some types of car bodies the diverging sides extending from the front of the bonnet to the sides of the car may act as such following air deflectors in connection with the front wheels and guards. To allow access of air to the following deflector sufficient space for air passage should be left between the inner edge of the deflector mudguard and any adjacent part of the vehicle.

Instead of being vertical the deflector mudguard may tilt or curve forward or backward provided it discharges its function of laterally and outwardly deflecting, and may also or alternately be curved transversely instead of being straight.

The accompanying drawings illustrate how this invention may be carried into effect.

Figure 1:
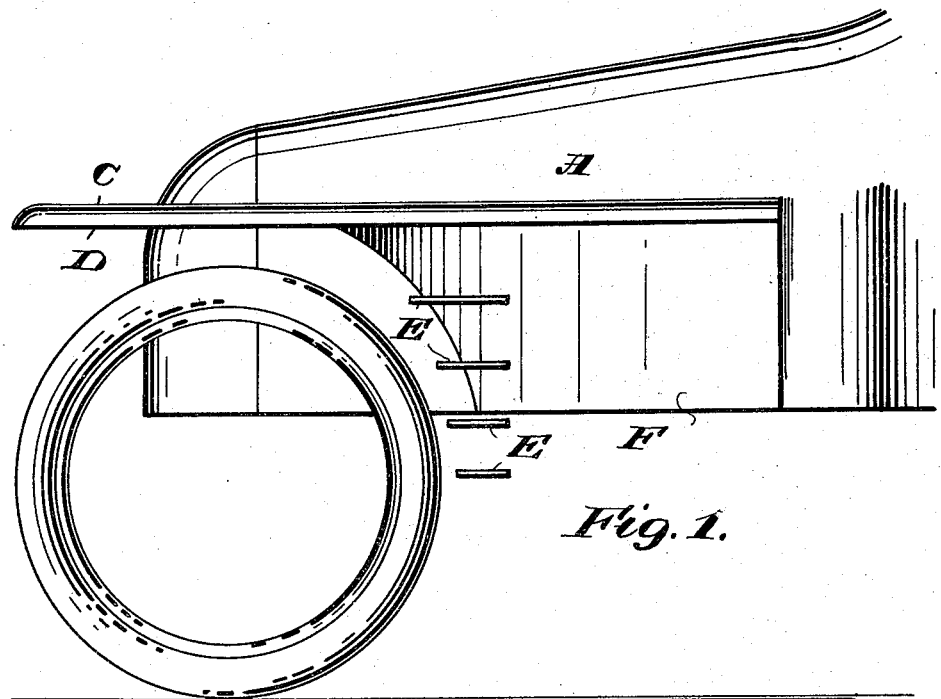
Figures 1 and 2 represent one form of the mudguard and its coöperating deflector in side elevation and plan respectively, constructed in accordance with the principles of the invention.
Figure 2:
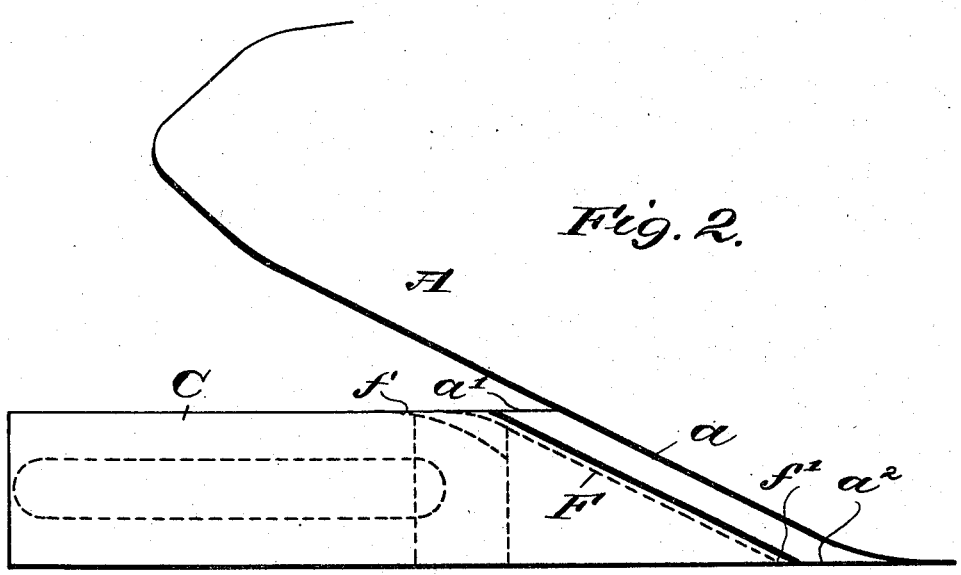

Referring first to Figs. 1 and 2. A indicates the body of the car. Above and extending behind the wheel is a plate C which is horizontal longitudinally and transversely and is formed along its outer edge (or along both edges if desired) with a downwardly depending flange D. Below the plate C are shorter horizontal plates E of about the same width as the plate C, giving clear air passages between themselves and between the upper one and the plate C. These plates form guards which are supplementary to plate C. Situated below the plate C—the under side of which it touches with its upper edge—and behind the plates E, is a deflector mudguard plate F, the inner edge of which is disposed below the inner edge of the plate C and the outer edge of which is below the outer edge of the plate C. As will be seen by a reference to Fig. 2 the inner edge $f$ of the deflector mudguard plate F is in advance of its outer edge $f^1$ along the body of the vehicle. The plate is vertically disposed. With such an arrangement and disposition, the mudguard F deflects outward all the air which rushes through the spaces between the upper plates E and between the uppermost of such plates and the plate C when the car is in motion.

To insure that none or as little as possible of this air with its dust or mud shall reach the sides of the body of the car there is combined with the mudguard F another deflector plate or surface behind it, similarly disposed and arranged, so that air which passes between the two deflectors is interposed as a stream or slice or cushion between the side of the car and the air which is deflected by the leading surface of the mudguard F. In the form of car and with the mudguard and accessories shown in Figs. 1 and 2 the inclined fore part $a$ of the car acts as this second deflector. The mudguard F is arranged about parallel to it, air entering the space between them at $a^1$, and being discharged at $a^2$.

If desired the forward edge of the plate F may be farther from the surface $a$ than its rear edge, thus giving a space of constantly decreasing area between them from the air inlet to the air outlet. This adds to the velocity of the air passing between the two deflectors and increasing the effect of such air in keeping the air deflected by the plate F away from the side of the car.

Figure 3:
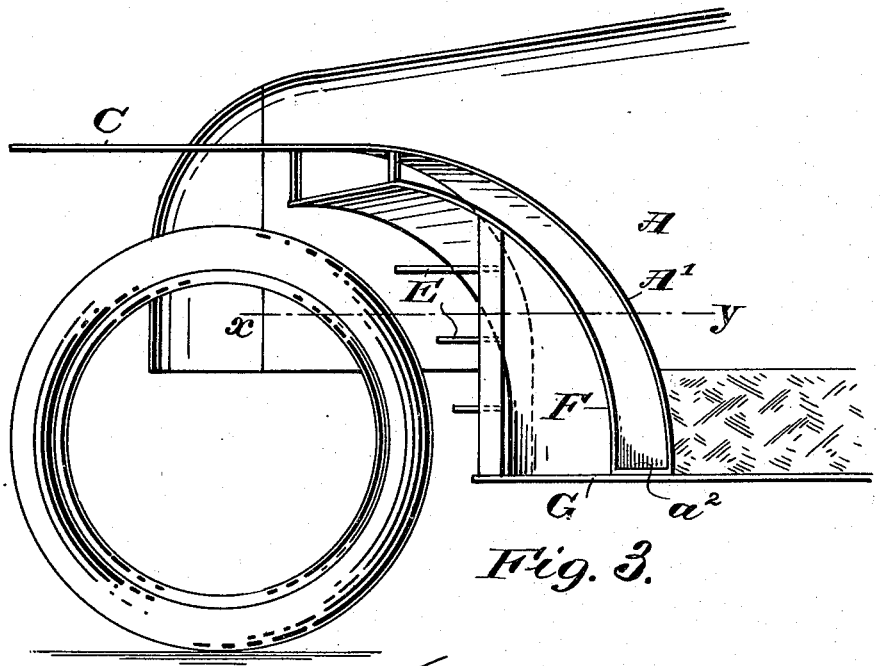
Figs. 3 and 4 illustrate an adaptation of my improvements to a motor car of the present customary form having a curved mudguard, Fig. 3 showing the mudguard and a coöperating air deflector in side elevation and Fig. 4 showing them in horizontal section taken along the line $x$—$y$ of Fig. 3.
Figure 4:
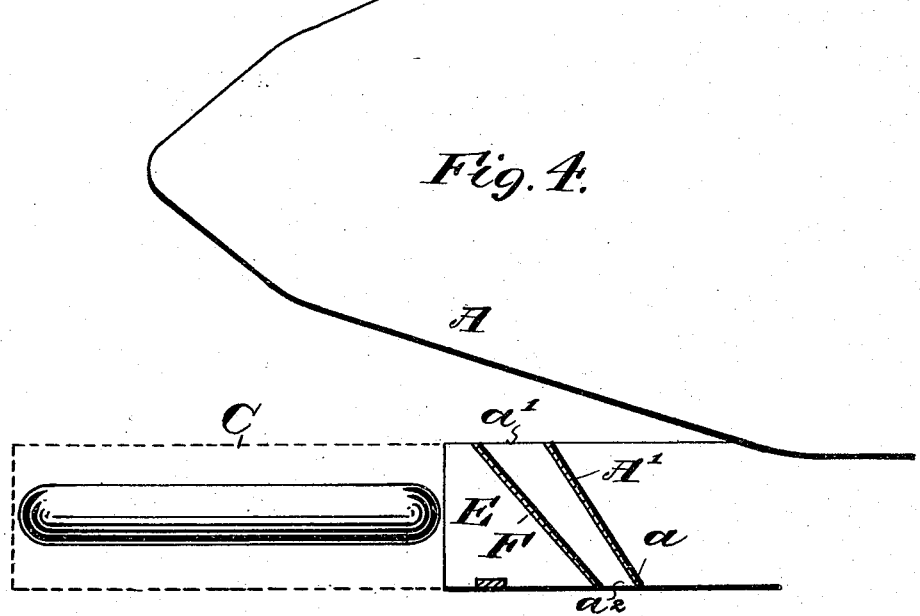

The mudguard F may be of other form than as shown in Figs. 1 and 2 and may have combined with it other forms of following deflector. In the modification shown in Figs. 3 and 4 the plate $A^1$ is bent down to a curve behind the wheel. Its rear part is bent outward and rearward as indicated at $a$ Fig. 4. In front of the plate $A^1$ and within it is the mudguard F of generally similar form and disposition, but with its inner edge at a greater distance from the plate $A^1$ than is its outer edge. As before E, E, indicate short horizontal plates, $a^1$ indicates the air inlet between the plates F and $A^1$, and $a^2$ the air outlet.

By placing a board G about horizontally in front of the lower end of the mudguard F and thus causing the whole of the dust or the like which is deflected outward by such guard to pass across the opening between the guard and its following deflector, a much greater proportion of the deflected dust or the like is kept clear of the following part of the vehicle than if the plate G were not used and dust could be deflected downward.

The plates E, E, may be omitted from the mudguard.

What I claim is:—

1. In a mudguard for the wheels of vehicles, a horizontal mudguard plate above the wheel and bent down behind the wheel, this part being bent outward and rearward, a deflector mudguard of similar form and disposition within the bent down part of the said horizontal mudguard leaving a space between them which is wider at the inside than at the outside, short horizontal plates within the deflector mudguard and an auxiliary plate projecting about horizontally forward from the lower end of the deflecting mudguard, substantially as described.

2. A mudguard comprising a guard plate disposed above the wheel and extending downwardly to the rear of the wheel, the inner edge of said plate being in advance of the outer edge, a deflector plate extending downwardly and disposed between said wheel and guard plate, the inner edge of said deflector plate being in advance of its outer edge and arranged in such a manner as to leave a passage for air between the two said plates.

3. A mudguard comprising a guard plate disposed above the wheel, a deflector plate extending downwardly from the said guard plate, the inner edge of the said deflector plate being in advance of the outer edge, said deflector plate being disposed so as to form a passage for the air between itself and the body of the car in which it is disposed, and an auxiliary plate projecting horizontally forward from the lower end of the first named downwardly projecting deflector plate.

4. A mudguard comprising a guard plate disposed above the wheel, a deflector plate extending downwardly from the said guard plate, the inner edge of the said deflector plate being in advance of the outer edge, said deflector plate being disposed so as to form a passage for the air between itself and the body of the car in which it is disposed, horizontal plates between the wheel and the downwardly extending deflector, and an auxiliary plate projecting horizontally forward from the lower end of the first named downwardly projecting deflector plate.

In witness whereof I have hereunto set my hand in the presence of two subscribing witnesses.

W. HEAP HOLLAND.

Witnesses:
FRANK ATTEYS,
MALCOLM SMETHURST.

Copies of this patent may be obtained for five cents each, by addressing the "Commissioner of Patents, Washington, D. C."